(12) United States Patent
McColloch (10) Patent No.: US 9,140,862 B2
(45) Date of Patent: Sep. 22, 2015

(54) METHODS, APPARATUSES AND SYSTEMS FOR BLIND MATING MULTI-OPTICAL FIBER CONNECTOR MODULES

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 86 days.

(21) Appl. No.: 14/168,522

(22) Filed: Jan. 30, 2014

(65) Prior Publication Data

US 2015/0212281 A1 Jul. 30, 2015

(51) Int. Cl.
*G02B 6/38* (2006.01)

(52) U.S. Cl.
CPC ............ *G02B 6/3885* (2013.01); *G02B 6/3883* (2013.01)

(58) Field of Classification Search
CPC .... G02B 6/388; G02B 6/3825; G02B 6/3897; G02B 6/3893; G02B 6/3887; G02B 6/38
USPC .................... 385/53, 55, 56, 59, 60
See application file for complete search history.

(56) References Cited

U.S. PATENT DOCUMENTS

| | | | |
|---|---|---|---|
| 6,390,690 B1* | 5/2002 | Meis et al. | 385/88 |
| 8,374,470 B2* | 2/2013 | Ban et al. | 385/49 |
| 2013/0089290 A1 | 4/2013 | Sloey et al. | |
| 2013/0156386 A1 | 6/2013 | Miller | |

OTHER PUBLICATIONS

Tyco Electronicas, AMP Z-Pack 2mm HM Hard Metric Interconnection System, 2005, 84 pages, Tyco Electronics Corporation, Harrisburg, Pennsylvania.

* cited by examiner

*Primary Examiner* — Jennifer Doan (57) ABSTRACT

Apparatuses, systems and methods are provided that enable N female multi-optical fiber connector modules disposed on a first structure to be simultaneously blind mated with N male multi-optical fiber connector modules disposed on a second structure, where N is a positive integer that is equal to or greater than one. Enabling the male and female multi-optical fiber connector modules to blind mate with one another obviates the need to individually interconnect the modules with optical cables. Each module is mounted on either a male or female socket, which, in turn, is mounted on the first or second structure. The first structure may be, for example, a rack having at least one slot configured to receive a server box, in which case the second structure is the server box itself.

20 Claims, 11 Drawing Sheets

METHODS, APPARATUSES AND SYSTEMS FOR BLIND MATING MULTI-OPTICAL FIBER CONNECTOR MODULES

TECHNICAL FIELD OF THE INVENTION

The invention relates to optical communications. More particularly, the invention relates to methods and systems for blind mating multi-optical fiber connector modules.

BACKGROUND OF THE INVENTION

Multi-optical fiber connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical multi-optical fiber connector module includes an optics system that couples light between the ends of the optical fibers and respective optoelectronic devices that are contained within the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as photodiodes.

The multi-optical fiber connector modules and the parallel optical communications modules typically have mating features on them that allow the multi-modules to be fixedly or removably mechanically coupled (i.e., mated) with one another. A variety of multi-optical fiber connector modules and parallel optical communications modules exist in the market today that are designed to mate with one another in a way that optically aligns the optical pathways between the ends of the optical fibers and the respective optoelectronic devices to enable optical data signals to be coupled between ends of the optical fibers and the respective optoelectronic devices. In designing and manufacturing the multi-optical fiber connector modules and the corresponding parallel optical communications modules, great care is taken to ensure that once the modules are mated together very precise optical alignment exists along the optical pathways.

A variety of passive and active optical alignment techniques and tools are used today to provide the precise optical alignment that is needed to prevent unacceptable optical losses from occurring. Unacceptable optical losses lead to signal degradation, which can lead to an unacceptable bit error rate (BER). When the multi-optical fiber connector modules and the corresponding parallel optical communications modules are manufactured, the manufacturing tolerances typically must be extremely tight in order to ensure that very precise optical alignment exists along the optical pathways when the modules are mated with one another in their ultimate relative positions and orientations. Otherwise, the optical alignment along the optical pathways will not have sufficient precision to prevent unacceptable optical losses from occurring. However, manufacturing the modules with very tight mechanical tolerances increases manufacturing costs, which increases the overall costs of the modules. In addition, the need to achieve very tight mechanical tolerances can lead to a decrease in yield for the modules, which also increases the overall costs of the modules.

Many connector modules are designed and manufactured to include passive alignment features, such as key/keyway mating features, which guide the modules into optical alignment with another mating module or receptacle as they are mechanically coupled together. For example, the opening in a receptacle guides a mating connector module into course alignment with the receptacle and then passive alignment features in the receptacle and on the connector module then mate to bring the optical pathways of the connector module into fine, or precise, optical alignment with the optical pathways of the receptacle. While such passive alignment features generally work well for their intended purposes, they are not suitable for simultaneous blind mating of multiple connector modules with multiple respective mating modules or receptacles.

For example, for a server box that has multiple multi-fiber connector modules disposed on it that must be mated with corresponding multi-fiber connector modules disposed on a printed circuit board (PCB) of a backplane, the connector modules disposed on the server box are individually manually interconnected with the respective connector modules disposed on the backplane by optical cables. As examples, in the case of LC optical connectors, an LC-to-LC optical cable is used to make the interconnection whereas in the case of MTP® optical connectors, an MTP-to-MTP optical cable is used to make the interconnection. Making these interconnections can be a difficult and time-consuming task.

A need exists for methods, apparatuses and systems that enable a plurality of multi-optical fiber connector modules disposed on one structure to be simultaneously blind mated with another plurality of connector modules disposed on another structure, thereby obviating the need to individually manually interconnect the connector modules.

SUMMARY OF THE INVENTION

The invention is directed to apparatuses, systems and methods for blind mating multi-optical fiber connector modules. The apparatus comprises a first socket having a first multi-optical fiber connector module mounted thereon. The first socket is adapted to mate with a second socket having a second multi-optical fiber connector module mounted thereon such that mating of the first and second sockets with one another results in mating of the first and second connector modules with one another. The first socket comprises a first socket housing having at least a first passive coarse alignment feature formed thereon. The first socket housing has at least an upper surface, a lower surface, a first end, and a second end. The first multi-optical fiber connector module is mounted on the upper surface of the first socket housing in a predetermined position and orientation relative to the first socket housing. The first multi-optical fiber connector module has a first connector module housing that has at least a first passive fine alignment feature formed thereon.

The first passive coarse alignment feature of the first socket housing is configured to engage and ultimately fully mate with a second passive coarse alignment feature formed on a second socket housing of the second socket. Engagement of the first and second passive coarse alignment features with one another brings the first and second passive fine alignment features of the first and second connector module housings into coarse alignment with one another. Full mating of the first and second passive coarse alignment features with one another results in full blind mating of the first and second fine alignment features with one another to place the first and second fine alignment features in a fully-mated state. When the first and second fine alignment features are in the fully-mated state, optical pathways of the first connector module are in precise alignment with respective optical pathways of the second connector module.

The system comprises a first structure, a mounting frame secured to the first structure, a first socket mounted on the mounting frame, a first multi-optical fiber connector module mounted on an upper surface of the housing of the first socket, a first plurality of optical fibers having first ends that are secured to the housing of the first multi-optical fiber connector module, a second structure, a second socket mounted on the second structure, a second multi-optical fiber connector module mounted on an upper surface of a housing of the second socket, and a second plurality of optical fibers having first ends that are secured to the housing of the second multi-optical fiber connector module.

The mounting frame has spring properties. The housing of the first socket has at least an upper surface, a lower surface, a first end, and a second end. The housing of the first socket has at least a first passive coarse alignment feature thereon. The housing of the second socket has an upper surface, a lower surface, a first end and a second end. The housing of the second socket has a second passive coarse alignment feature thereon that is mated with the first passive coarse alignment feature. The housing of the first multi-optical fiber connector module has at least a first passive fine alignment feature thereon. The housing of the second multi-optical fiber connector module has at least a second passive fine alignment feature thereon that blind mates with the first passive fine alignment feature when the first and second passive coarse alignment features mate with one another. When the first and second fine alignment features are in the fully-mated state, optical pathways of the first connector module are in precise alignment with respective optical pathways of the second connector module.

These and other features and advantages of the invention will become apparent from the following description, drawings and claims.

BRIEF DESCRIPTION OF THE DRAWINGS

FIGS. 9A and 9B illustrate side cross-sectional perspective views of a cross bar of a rack (not shown) having a mounting frame secured thereto by a bridle of the mounting frame, and wherein the female socket shown in FIGS. 3 and 4 is shown mounted on the mounting frame; the side cross-sectional views of the female socket shown in FIGS. 9A and 9B are taken along line A-A' of FIG. 4; FIG. 9A shows the female socket shown in FIG. 3 in the process of being snapped into a mounting spring socket of a mounting frame; FIG. 9B shows the female socket after it has been snapped into place in the spring socket.

DETAILED DESCRIPTION OF AN ILLUSTRATIVE EMBODIMENT

In accordance with embodiments of the invention, apparatuses, systems and methods are provided that enable N female multi-optical fiber connector modules disposed on a first structure to be simultaneously blind mated with N male multi-optical fiber connector modules disposed on a second structure, where N is a positive integer that is equal to or greater than one. Enabling the male and female multi-optical fiber connector modules to blind mate with one another obviates the need to individually interconnect the modules with optical cables. Each module is mounted on either a male or female socket, which, in turn, is mounted on the first or second structure. The first structure may be, for example, a rack having at least one slot configured to receive a server box, in which case the second structure is the server box itself.

As the first and second structures are brought into engagement with one another, passive coarse alignment features of the male and female sockets begin to mate with one another. The act of mating the passive coarse alignment features of the male and female sockets with one another causes passive fine alignment features of the male and female connector modules to be brought into coarse alignment with one another. Once the passive fine alignment features of the male and female connector modules have been brought into coarse alignment with one another, the continued mating of the passive coarse alignment features of the male and female sockets causes the passive fine alignment features of the male and female connector modules to engage one another. As the male and female sockets are moved into their fully-mated configuration, the passive fine alignment features of the male and female connector modules fully mate with one another. Once the male and female connector modules are in their fully-mated configuration such that the fine alignment features are fully mated with one another, the respective connector modules are finely aligned with one another such that their respective optical pathways are in precise optical alignment with one another. Blind mating the connector modules with one another in this way eliminates the need to use optical cables or the like to optical interconnect the respective connector modules.

Prior to describing the male and female sockets on which the multi-optical fiber connector modules are mounted and the structures on which the male and female sockets are mounted, examples of male and female multi-optical fiber connector modules that are suitable for use with the sockets will be described.

Like reference numbers in the figures represent like elements, features, or components. The features in the drawings are not necessarily drawn to scale. It should be noted that the invention is not limited with respect to the multi-optical fiber connector modules that are used with the sockets and that the multi-optical fiber connector modules being described herein are merely examples of modules that are suitable for use with the sockets.

Figure 1:
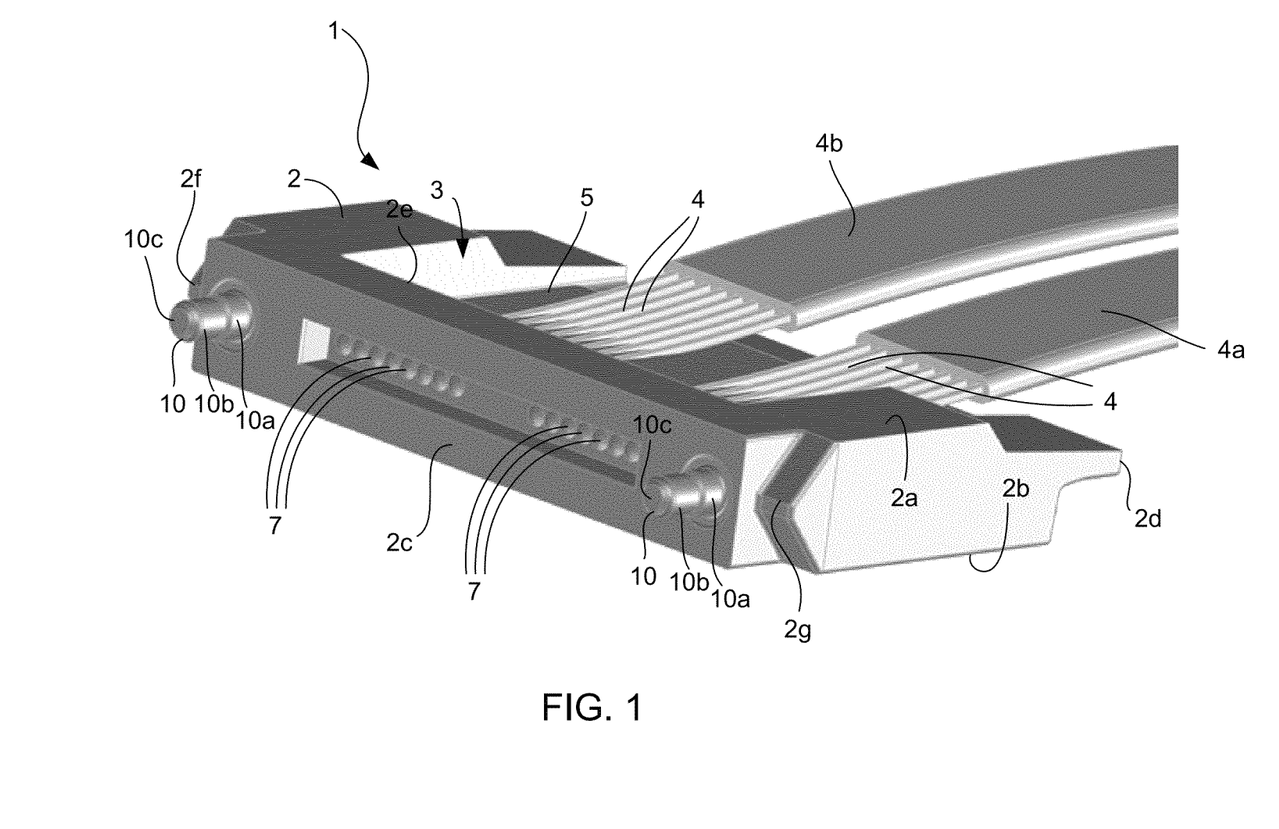
FIG. 1 illustrates a perspective view of the male multi-optical fiber connector module in accordance with an illustrative embodiment.

FIG. 1 illustrates a perspective view of the male multi-optical fiber connector module 1 in accordance with an illustrative embodiment. The male multi-optical fiber connector module 1 comprises a module housing 2 having an upper surface 2a, a lower surface 2b a front surface 2c, a back end 2d. A cavity 3 is formed in the upper surface 2a for receiving ends of a plurality of optical fibers 4 of two optical fiber cables 4a and 4b. In accordance with this illustrative embodiment, there are a total of sixteen optical fibers 4 and the multi-fiber connector module 1 has sixteen respective optical pathways, although the invention is not limited with respect to the number of optical fibers that are connected to the connector module 1 or the number of optical channels that are provided in the connector module 1. The module housing 2 is typically a molded, unitary plastic part, although the invention is not limited with respect to the composition of the module housing 2.

The multi-optical fiber connector module 1 has features that are similar or identical to features of a multi-optical fiber connector module that is disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

As can be seen in FIG. 1, the upper surface 2a of the module housing 2 has a cavity 3 formed therein. The cavity 3 functions as an optical fiber holding chamber for holding the ends of the optical fibers 4. The cavity 3 has a lower surface in which a plurality of grooves (not shown) are formed. Each groove is V-shaped. Prior to securing the ends of the optical fibers 4 within the cavity 3, each optical fiber 4 is cleaved and then a portion of the jacket is removed, leaving an unjacketed fiber end portion. The unjacketed fiber end portions of the fibers 4 are positioned within the respective grooves of the cavity 3. A refractive index matching (RIM) epoxy 5 that is transparent to the primary wavelength of the optical signals being carried on the optical fibers 4 is dispensed into the cavity 3. The RIM epoxy 5 fills any imperfections in the cleaved ends of the optical fibers 4, thereby making the joints transparent to the optical beams so that no internal reflection occurs at this boundary. When the epoxy 5 is dispensed into the cavity 3, it flows between, and is in contact with, the bottom and side walls of the cavity 3 and with the unjacketed fiber end portions. When the epoxy 5 cures and becomes hardened, it fixedly secures the ends of the unjacketed fiber end portions within the respective V-shaped grooves.

The ends of the unjacketed fiber end portions are adjacent to, or in contact with, the wall 2e of the module housing 2. The wall 2e of the module housing 2 is one of the side walls that define the cavity 3. Respective openings are formed in the module housing 2 that extend in the axial directions of the grooves from the cavity 3 through the wall 2e and through a front surface 2c of the module housing 2. Within these openings, respective collimating lenses 7 are disposed in the front surface 2c of the module housing 2. First and second passive fine alignment features 10 extend from the front surface 2c of the module housing 2. The passive fine alignment features 10 are identical in structure to one another and have stepped cylindrical shapes made up of first and second cylindrical portions 10a and 10b, where the first cylindrical portion 10a has a diameter that is greater than a diameter of the second cylindrical portion 10b. The passive fine alignment features 10 are rounded where they transition from the second cylindrical portions 10b to their ends 10c. The passive fine alignment features 10 are designed to mate with respective openings formed in another module (not shown), as will be described below in more detail.

Figure 2:
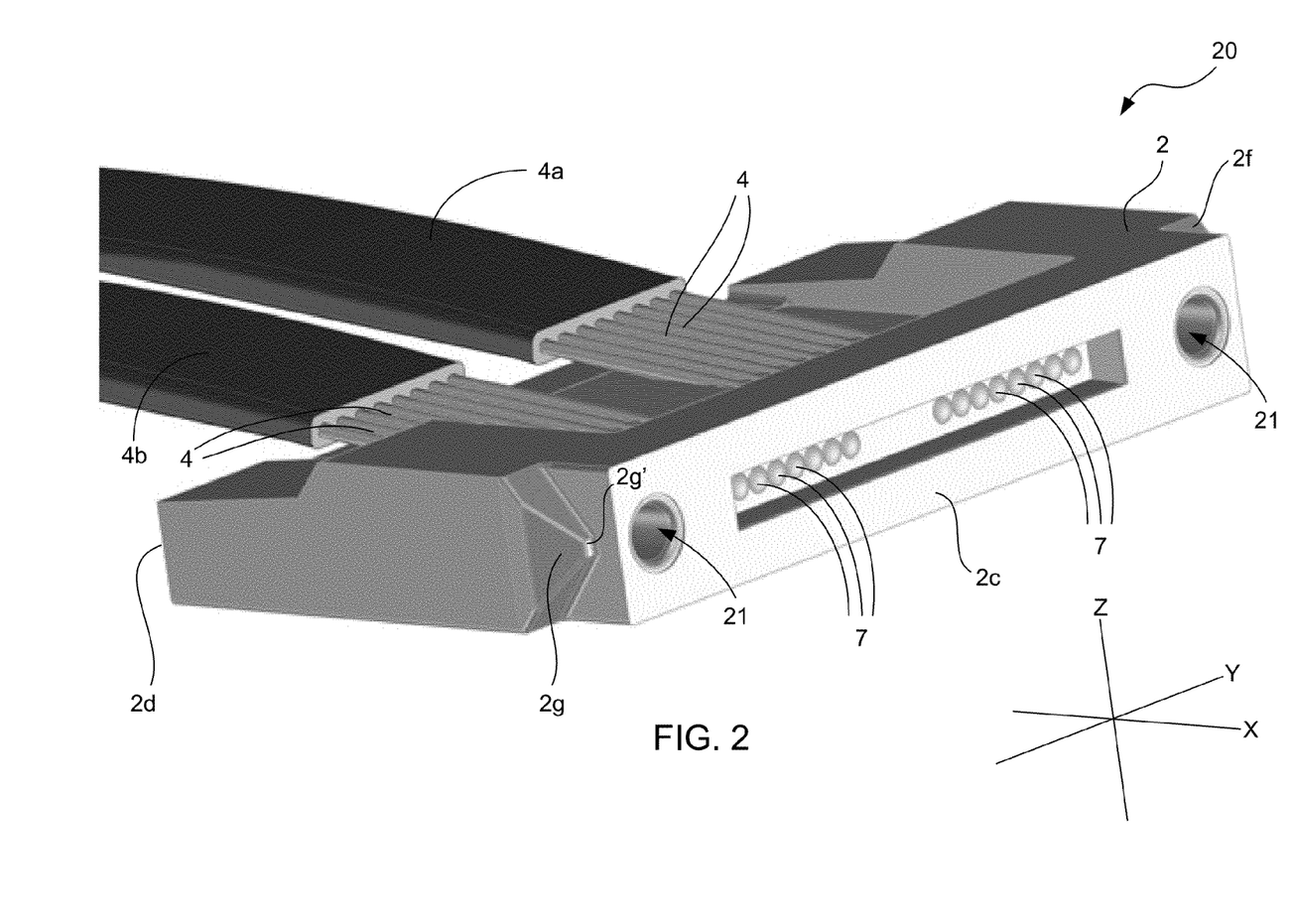
FIG. 2 illustrates a perspective view of the female multi-optical fiber connector module 20 designed to mate with the male multi-optical fiber connector module 1 shown in FIG. 1.

FIG. 2 illustrates a perspective view of the female multi-optical fiber connector module 20 designed to mate with the male multi-optical fiber connector module 1 shown in FIG. 1. The module 20 has a module housing 2 that is identical to the module housing 2 shown in FIG. 1 except that the module housing 2 shown in FIG. 2 has openings 21 formed therein that are complementary in shape to the passive fine alignment features 10 of the module 1 shown in FIG. 1. As will be described below in more detail, when the alignment features 10 of the module 1 are aligned with the respective alignment features 21 of the modules 20 and the surfaces 2c of the modules 1 and 20 are brought into contact with one another, the alignment features 10 mate with the respective alignment features 21. When the modules 1 and 20 are in this fully-mated configuration, the collimating lenses 7 of the modules 1 and 20 are in precise optical alignment with one another and the optical pathways (not shown) of the modules 1 and 20 are in precise optical alignment with one another. Thus, the mating of the passive fine alignment features 10 and 21 effectuates the aforementioned fine alignment process, but the aforementioned coarse alignment process is effectuated by engagement of respective passive coarse alignment features (not shown) that are disposed on sockets (not shown) on which the modules 1 and 20 are mounted, as will now be described.

Figure 3:
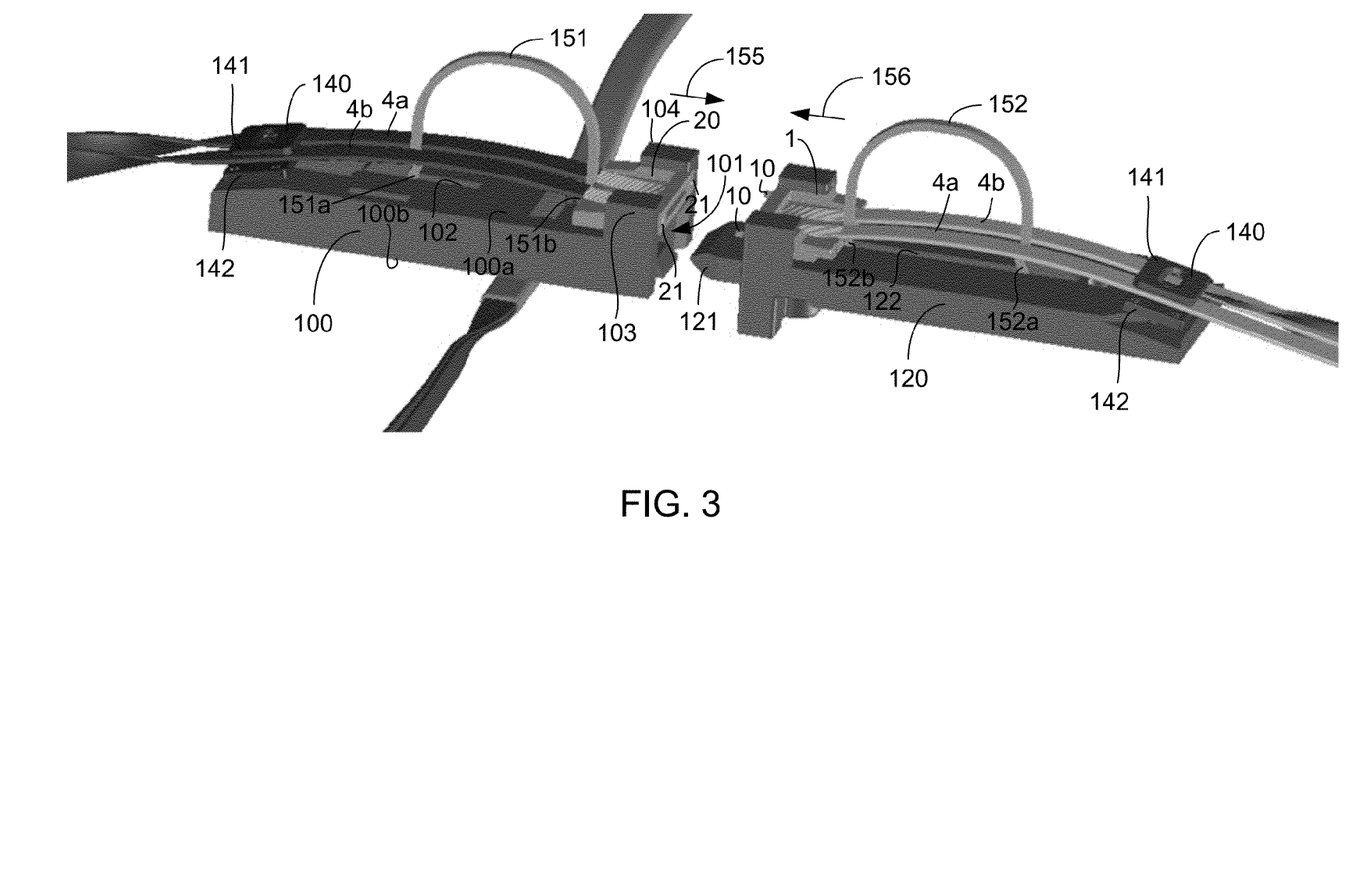
FIG. 3 illustrates a perspective view of a female socket on which the female multi-optical fiber connector module shown in FIG. 2 is mounted about to be mated with a male socket on which the male multi-optical fiber connector module shown in FIG. 1 is mounted.

FIG. 3 illustrates a perspective view of a female socket 100, on which the female multi-optical fiber connector module 20 shown in FIG. 2 is mounted, about to be mated with a male socket 120, on which the male multi-optical fiber connector module 1 shown in FIG. 1 is mounted. The female socket 100 has a receptacle 101 formed therein that is shaped and sized to mate with a tongue 121 of the male socket 120. Engagement of the tongue 121 with the receptacle 101 brings the multi-optical fiber connector modules 1 and 20 into coarse alignment with one another such that the passive fine alignment features 10 and 21 of the modules 1 and 29, respectively, begin to engage one another. As the tongue 121 and the receptacle 101 continue to engage one another, the passive fine alignment features 10 and 21 of the modules 1 and 20, respectively, continue to engage one another to bring the modules 1 and 20 into fine alignment with each other. Thus, full mating of the tongue 121 and the receptacle 101 results in full mating of the modules fine alignment features 10 and 21 to bring the modules 1 and 20 into precise optical alignment with one another.

Providing the passive fine alignment features 10 with the stepped cylindrical shape shown in FIG. 1 provides some advantages over using long tapered pins. Long tapered pins being inserted into the respective reciprocally-shaped tapered openings have a tendency to stick due to the nearly-continuous contact that occurs between the surfaces of the pins and the respective openings as they engage one another. If sticking occurs, it is possible that the respective passive fine alignment features will not fully engage one another, which can result in less than perfect misalignment. One advantage of the stepped passive fine alignment features 10 is that there is less of a tendency to stick during insertion into the respective openings due to there being less surface-to-surface contact during insertion. This feature ensures that full mechanical coupling will occur, which ensures that precise optical alignment will be achieved. Another advantage is that the stepped cylindrical shapes are easier and less costly to manufacture than tapered shapes. As stated above, however, the invention is not limited with respect to the shapes and configurations of the modules 1 and 20.

In the illustrative embodiment shown in FIG. 3, the sockets 100 and 120 also have respective cleave holders 140 mounted thereon that are identical in structure and dimensions. In accordance with an illustrative embodiment, the cleave holder 140 is secured to the fibers 4 before the modules 1 and 20 are secured to the ends of the fibers 4 and is used to hold the fibers 4 as they are being cleaved to desired lengths and stripped of their jackets. The cleave holder 140 remains secured to the fibers 4 after the modules 1 and 20 have been assembled and secured to the stripped and cleaved ends (not shown) of the fibers 4. The cleave holder 140 typically comprises a molded plastic body having an upper portion 141 and a lower portion 142 that are mechanically coupled to one another. One or both of the upper and lower portions 141 and 142 has grooves formed in lower and upper surfaces thereof, respectively. Length-wise portions of the fibers 4 are laid in the grooves and secured therein.

With the fibers 4 fixedly secured in position within the cleave holder 140, and with the cleave holder body 141 mounted on a stripper and cleaver tool, the fibers 4 are stripped and the ends are cleaved with very high precision such that the length of the fibers 4 from a particular location in the cleave holder 140 to the fiber end faces is equal to a very precise, predetermined value. Once the fibers 4 have been secured in place within the cleave holders 140, the cleave holders 140 are mounted on the sockets 100 and 120 such that pins (not shown) disposed on the sockets 100 and 120 are received in respective holes (not shown) of the lower portion 142 of the cleave holders 140. An adhesive material such as glue may be used to fixedly secure the cleave holders 140 to the sockets 100 and 120. The cleave holders 140 provide strain relief for the fibers 4.

Springs 151 and 152 are mechanically coupled to the sockets 100 and 120, respectively, via slots 102 and 122, respectively, formed in the sockets 100 and 120, respectively. Proximal ends 151a and 152a of the springs 151 and 152, respectively, are immovable whereas distal ends 151b and 152b of the springs 151 and 152, respectively, are free to move within the respective slots 102 and 122. The distal ends 151b and 152b of the springs 151 and 152 are in contact with the back ends 2d (FIGS. 1 and 2) of the module housings 2. The forces of the springs 151 and 152 in their loaded states shown in FIG. 3 urge the modules 20 and 1, respectively in the directions indicated by arrows 155 and 156, respectively, until the modules 20 and 1 abut tapered stops (not shown) formed in the sockets 100 and 120 that prevent further movement of the modules 20 and 1 in the directions of arrows 155 and 156, respectively. These tapered stops are described below in more detail.

Figure 4:
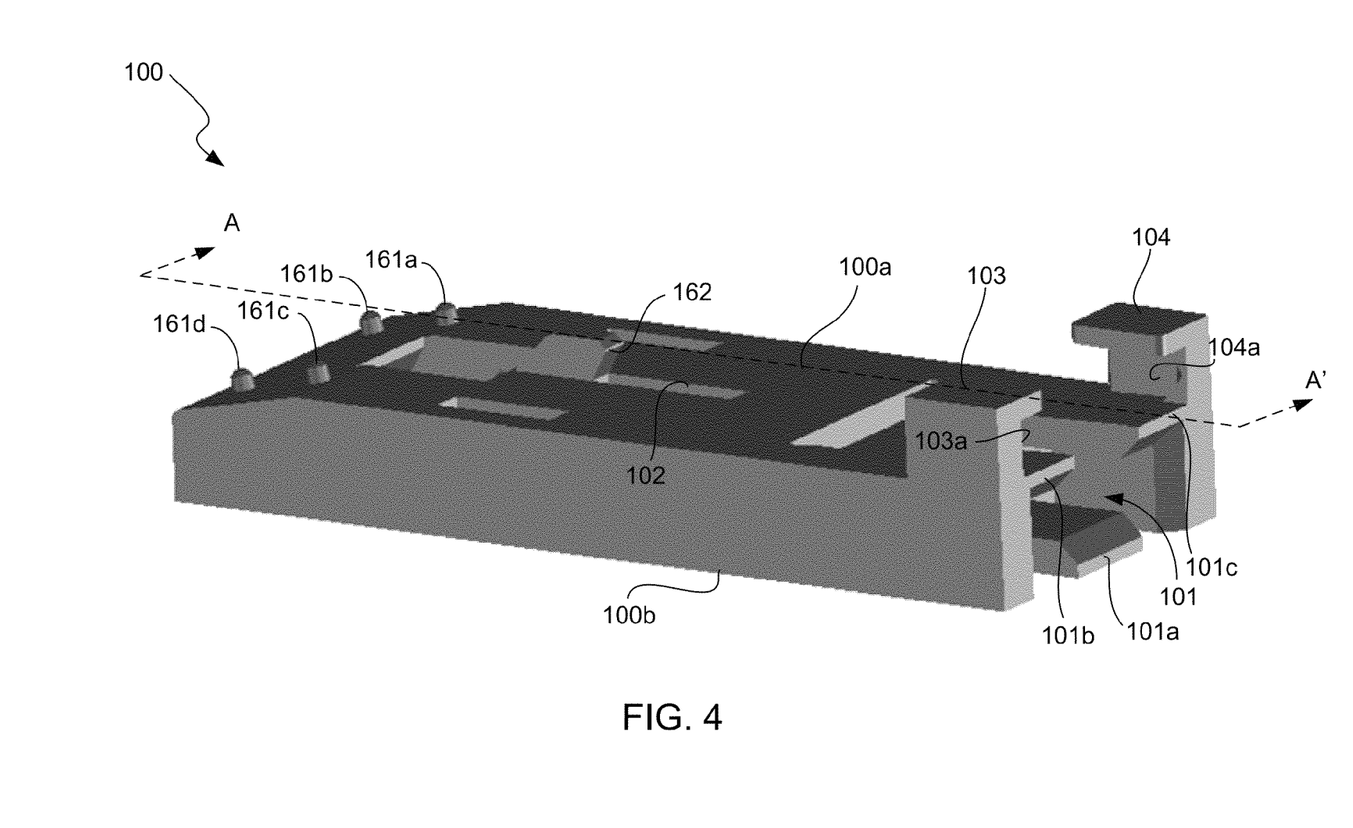
FIG. 4 illustrates a perspective view of the female socket shown in FIG. 3 with the module, the cleave holder and the spring removed.

FIG. 4 illustrates a perspective view of the female socket 100 shown in FIG. 3 with the module 20, the cleave holder 140 and the spring 151 removed. The receptacle 101 of the socket 100 has alignment features 101a, 101b and 101c therein that define the shape of the receptacle 101. The alignment feature 101a, which defines a bottom of the receptacle 101, tapers upwardly such that it is smaller in width at the entrance of the receptacle 101 and gradually increases in width to a constant width once inside of the receptacle 101. The alignment features 101b and 101c taper downwardly such that they are smaller in width at the entrance of the receptacle 101 and gradually increase in width to a constant width once inside of the receptacle 101. The manner in which these alignment features 101b and 101c mate with the tongue 121 of socket 120 shown in FIG. 3 is described below in more detail.

The socket 100 has an upper surface 100a and a lower surface 100b. A plurality (e.g., four) of pins 161a-161d are disposed on the upper surface 100a for mating with openings (not shown) formed in the lower portion 142 (FIG. 3) of the cleave holder 140 (FIG. 3). The openings that formed in the lower portion 142 of the cleave holder 140 are complementary in shape and size to the shape and size of the pins 161a-161d. It can be seen from FIG. 3 that the portions of the fibers 4 that extend in between the cleave holders 140 and the modules 1 and 100 have some slack in them to provide strain relief for the ends of the fibers 4 that are secured to the modules 1 and 100.

A stop 162 (FIG. 4) disposed at the back end of the slot 102 abuts the proximal end 151a of the spring 151 to prevent the proximal end 151a of the spring 151 from moving in the rearward direction of the socket 100 (i.e., in the direction opposite the direction of arrow 155). This stop 162 enables the spring 151 to be loaded to exert the force on the module 20 that urges the module 20 in the direction of arrow 155. The module 20 sits on the upper surface 100a of the socket 100 and is urged forward by the spring 151 into contact with side arms 103 and 104 of the socket 100. As will be described below in more detail, the arms 103 and 104 have tapered stops (not shown) formed on their inner walls 103a and 104a (FIG. 4) that prevent further forward movement of the module 20 in the direction of arrow 155 (FIG. 3). The inner walls 103a and 104a are identical to one another and are complementary in shape to the shapes of side chamfers 2f and 2g (FIG. 2) disposed on opposite sides of the module housing 2. As will be described below in more detail, these tapered stops mate with, but are slightly larger than, the chamfers 2f and 2g to allow some freedom of movement of the module 20 when it is in the forward position shown in FIG. 3.

Figure 5:
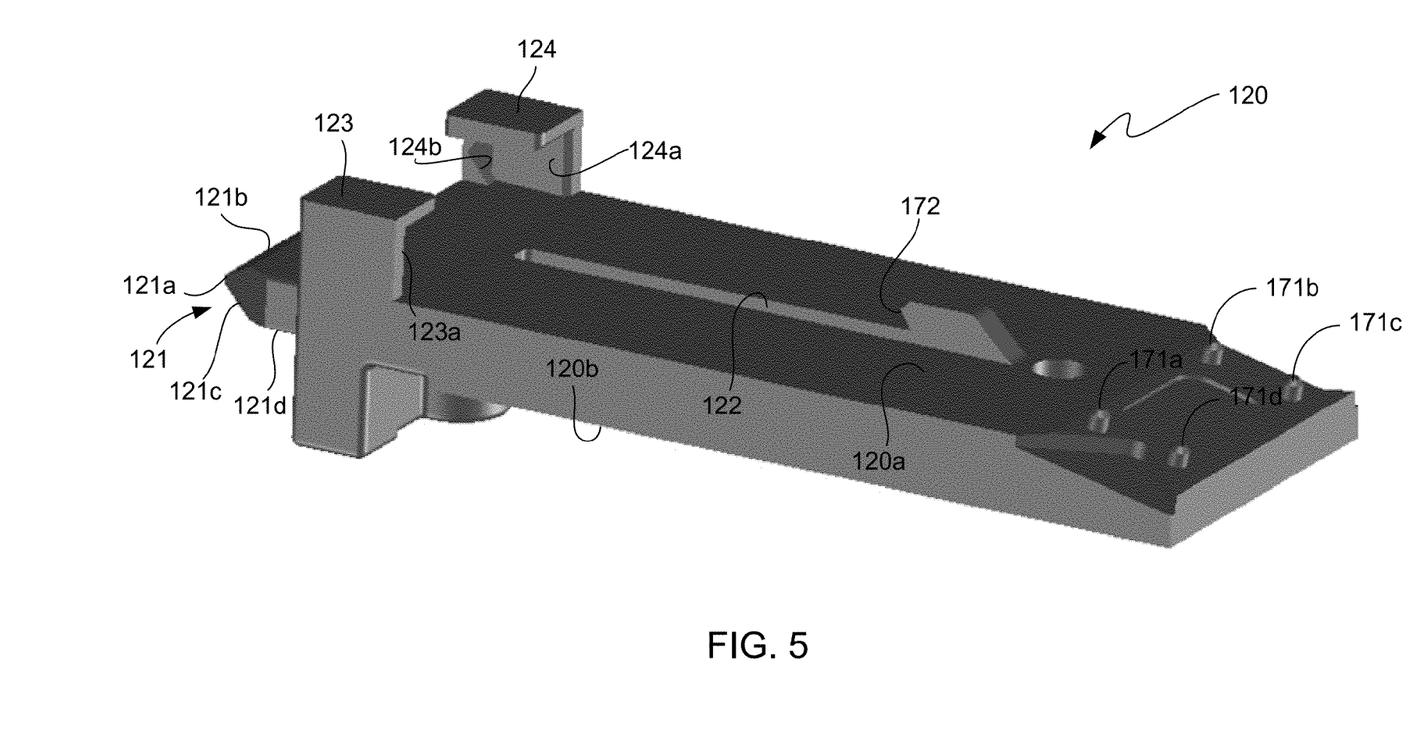
FIG. 5 illustrates a perspective view of the male socket shown in FIG. 3 with the module, the cleave holder and the spring removed.

FIG. 5 illustrates a perspective view of the male socket 120 shown in FIG. 3 with the module 1, the cleave holder 140 and the spring 152 removed. The tongue 121 of the socket 120 constitutes an alignment feature that is complementary in shape and size to the shape and size of the inner surfaces of the receptacle 101 defined by the alignment features 101a-101c (FIG. 4). Starting at a tip 121a of the tongue 121, the tongue 121 has an upwardly tapering portion 121b and downwardly tapering portion 121b that gradually taper the width of the tongue from a smaller width at the tip 121a to a portion 121d that has a larger, constant width. This constant width is equal to the constant-width inside of the receptacle 101.

The socket 120 has an upper surface 120a and a lower surface 120b. A plurality (e.g., four) of pins 171a-171d are disposed on the upper surface 100a for mating with openings (not shown) formed in the lower portion 142 (FIG. 3) of the cleave holder 140 (FIG. 3). The openings that formed in the lower portion 142 of the cleave holder 140 are complementary in shape and size to the shape and size of the pins 171a-171d. A stop 172 (FIG. 5) disposed at the back end of the slot 122 abuts the proximal end 152a of the spring 152 to prevent the proximal end 152a of the spring 152 from moving in the rearward direction of the socket 120 (i.e., in the direction opposite the direction of arrow 156). This stop 172 enables the spring 152 to be loaded to exert the force on the module 1 (FIG. 3) that urges the module 1 in the direction of arrow 156. The module 1 sits on the upper surface 120a of the socket 120 and is urged forward by the spring 152 into contact with side arms 123 and 124 of the socket 100. As will be described below in more detail, the arms 123 and 124 have tapered stops formed on their inner walls 123a and 124a (FIG. 5), respectively, that prevent further forward movement of the module 1 in the direction of arrow 156 (FIG. 3). One of these tapered stops 124b is visible in FIG. 5. The inner walls 123a and 124a are identical to one another and are complementary in shape to the shapes of side chamfers 2f and 2g (FIG. 1) disposed on opposite sides of the module housing 2. As will be described below in more detail, these tapered stops engage the chamfers 2f and 2g to restrict the movement of the module 1 when it is in the forward position shown in FIG. 3.

With reference again to FIG. 3, when the sockets 100 and 120 are coarsely aligned with one another such that the tongue 121 and the receptacle 101 are in coarse alignment with one another (e.g., within 50 mils in any direction of precise alignment), continued movement of the sockets 100 and 120 toward one another will ultimately result in the sockets 100 and 120 fully mating with one another. In other words, the tapered surfaces of the tongue 121 and of the receptacle 101 allow for some misalignment of the sockets 100 and 120 (e.g., 50 mils of misalignment in any direction) while still ensuring that the tongue 121 and the receptacle 101 will engage one another and ultimately mate with one another. This allows the sockets 100 and 120 to blind mate with one another provided they are only misaligned with one another within some tolerance, e.g., 50 mils.

As the sockets 100 and 120 are coarsely aligned with one another and moved toward one another, the alignment features 10 of the male socket 1 will begin to initially engage the alignment features 21 of the female socket 20. Even if the sockets 100 and 120 are misaligned within some tolerance, e.g., 50 mils, but close enough to one another that the modules 1 and 20 are in contact with one another, the alignment features 10 of module 1 will begin to engage the alignment features 21 of module 20. Once the alignment features 10 and 21 begin to engage one another, continued movement of the sockets 100 and 120 toward one another will cause the alignment features 10 and 21 to continue to engage one another until they are in the fully-mated state. In the fully-mated state of the alignment features 10 and 21, the modules 1 and 20 are in precise (i.e., fine) alignment with one another such that their optical pathways are precisely aligned. Thus, blind mating of the sockets 100 and 120 within the misalignment tolerance ultimately results in fine alignment of the modules 1 and 20.

Figure 6:
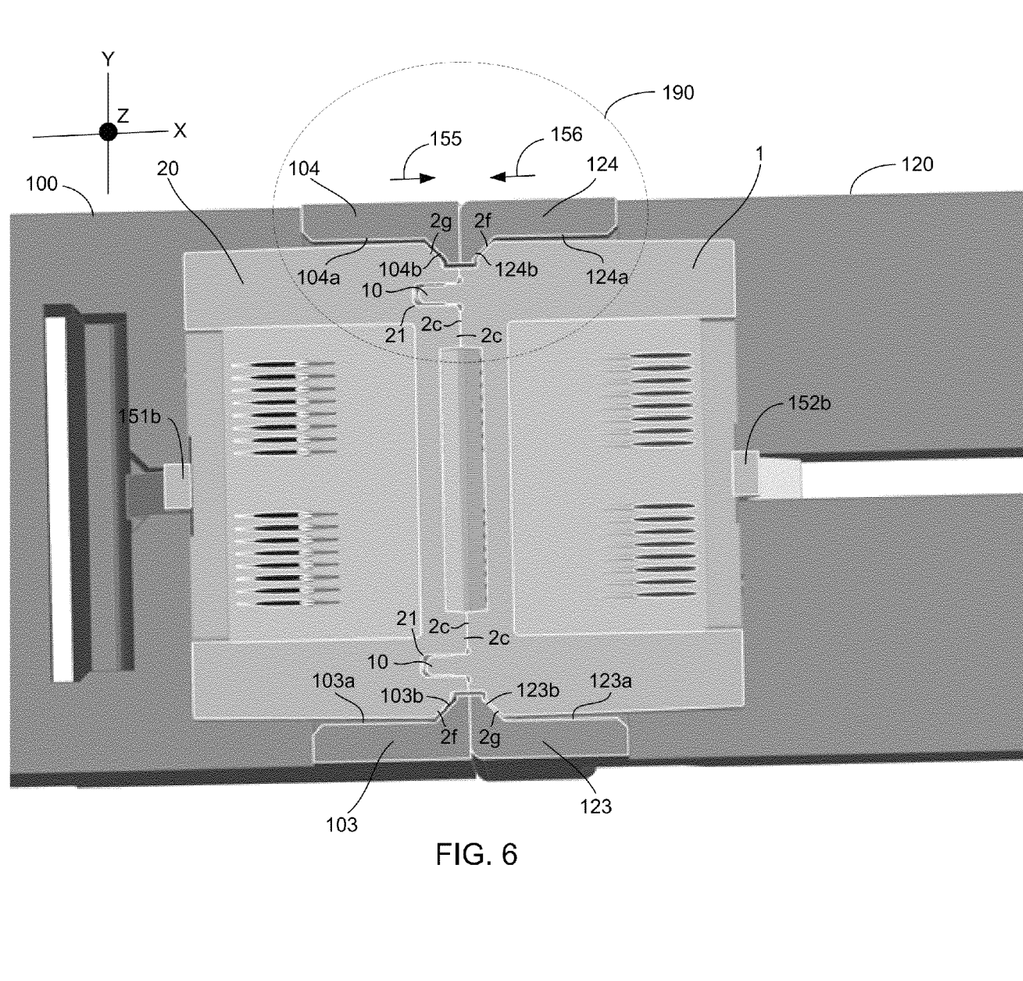
FIG. 6 illustrates a top view of the sockets and the modules shown in FIG. 3 in the fully-mated state.

FIG. 6 illustrates a top view of the sockets 100, 120 and the modules 1, 20 shown in FIG. 3 in the fully-mated state. In FIG. 6, top portions of the arms 103, 104, 123 and 124 have been removed to allow the interaction between the chamfers 2g of the modules 1 and 20 and the tapered stops 103b, 104b, 123b and 124b formed on the inner walls 103a, 104a, 123a and 124a of the arms 103, 104, 123 and 124, respectively, to be clearly seen. With reference to FIG. 2, the shape of the chamfers can be clearly seen by looking at chamfer 2g. The chamfer 2g thins in the Y and Z dimensions as it nears the front surface 2c of the module 20. At the location where the chamfer 2g ends near the front surface 2c, the chamfer 2g converges in the Y and Z dimensions to an apex 2g'.

With reference again to FIG. 6, the portions of the inner walls 103a, 104a, 123a and 124a that form the tapered stops 103b, 104b, 123b and 124b, respectively, are complementary in shape to the shapes of the respective chamfers 2f and 2g, but the chamfers 2f and 2g are slightly smaller in size than the respective tapered stops 103b, 104b, 123b and 124b in the X, Y and Z dimensions. This size difference allows some freedom of movement of the modules 1 and 20 relative to the sockets 120 and 100, respectively, in the X, Y and Z dimensions as the sockets 100 and 120 and the modules 1 and 20 are engaging one another. The distal ends 151b and 152b of the springs 151 and 152, respectively, urge the modules 1 and 20 toward one another causing their front surfaces 2c to come into contact with one another. The opposing forces provided by the springs 151 and 152 and the space in between chamfers 2f and 2f and the respective tapered stops 103b, 104b, 123b and 124b allow the modules 1 and 20 to float, or move, to a limited extent within their respective sockets 120 and 100 in the X, Y and Z directions, while also centering the modules 1 and 20 within their respective sockets 120 and 100 when the modules 1 and 20 are not in contact with one another.

The engagement of the tapered stops 103b, 104b, 123b and 124b with the respective chamfers 2f and 2g limits the extent to which the modules 1 and 20 are able to float, or move, within their respective sockets 120 and 100. Allowing the modules 1 and 20 to float to a limited extent within the sockets 120 and 100, respectively, ensures that the respective alignment features 10 and 21 will blindly engage one another and ultimately fully mate with one another when the respective sockets 100 and 120 are blind mated with one another.

Figure 7:
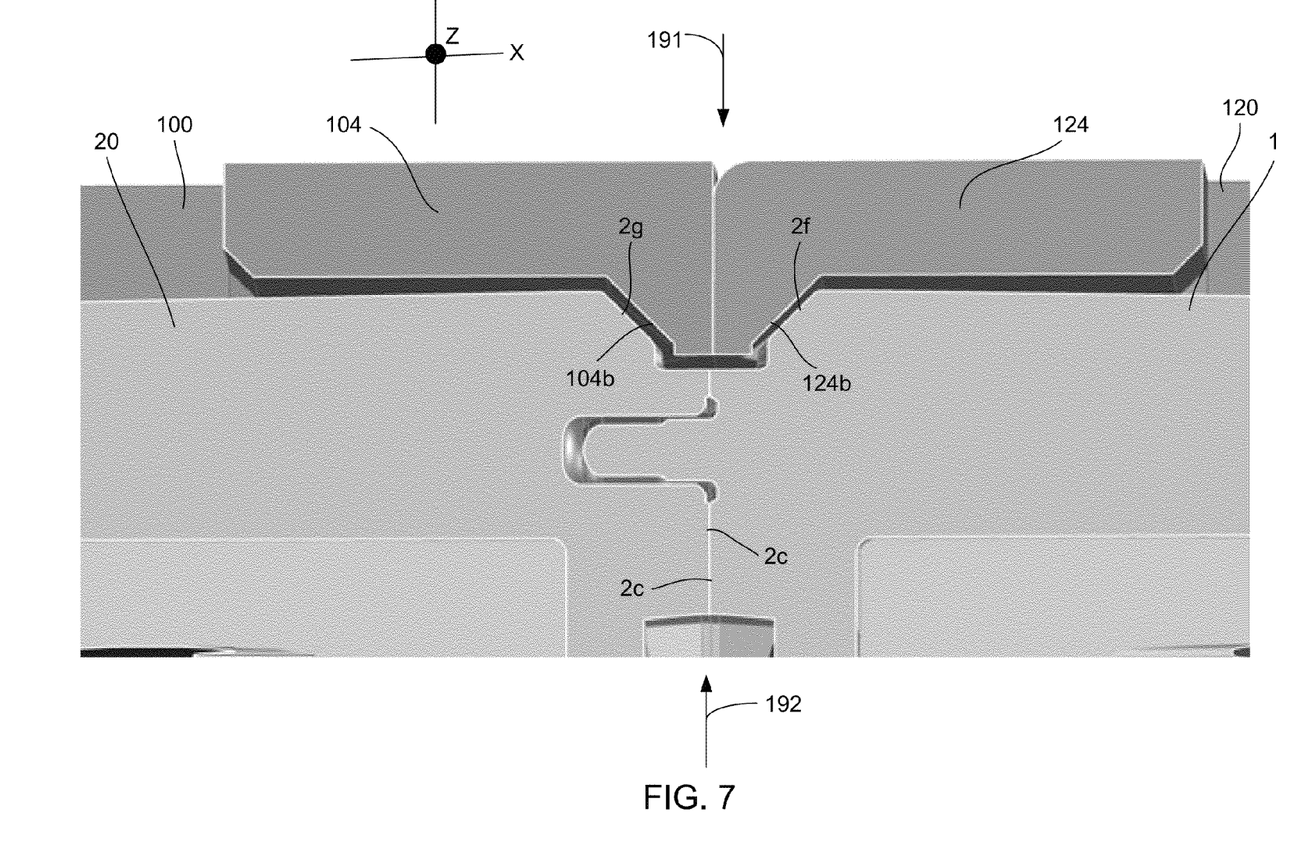
FIG. 7 illustrates a top perspective view of an expanded portion of the view shown in FIG. 6 within the dashed circle labeled with reference numeral 190.

FIG. 7 illustrates a top perspective view of an expanded portion of the view shown in FIG. 6 within the dashed circle labeled with reference numeral 190. As the distal ends 151b and 152b of the springs 151 and 152 (FIG. 6) urge the sockets 100 and 120 forward into abutment with one another, the chamfers 2g and 2f slide along the tapered stops 104b and 124b, respectively. When the front surfaces 2c of the modules 1 and 20 are not in contact with one another (FIG. 3), the interaction of the tapered stops 104b and 124b with the chamfers 2g and 2f, respectively, directs the modules 20 and 1 in the Y direction indicated by arrow 191. Likewise, on the opposite side of the sockets 100 and 120 (FIG. 6), the interaction between the chamfers 2f and 2g and the tapered stops 103b and 123b (FIG. 6), respectively, directs the modules 20 and 1 in the opposite Y direction indicated by arrow 192 (FIG. 7). The combined effect of the chamfers 2g and 2f and the tapered stops 103b, 104b, 123b and 124b when the front surfaces 2c of the modules 1 and 20 are not in contact with one another is to align the modules 1 and 20 in the Y dimension within their respective sockets 120 and 100. Because the shapes of the chamfers 2g and 2f and the tapered stops 103b, 104b, 123b and 124b are also complementary in the Z dimension, the interaction between the chamfers 2g and 2f and the tapered stops 103b, 104b, 123b and 124b also has the effect of aligning the modules 1 and 20 within their respective sockets 120 and 100 in the Z dimension when the front surfaces 2c of the modules 1 and 20 are not in contact with one another.

When the front surfaces 2c of the modules 1 and 20 are not in contact with each other as shown in FIG. 3, the modules 1 and 20 are slightly proud of their respective sockets 120 and 100. In other words, the front surfaces 2c of the modules 1 and 20 are slightly forward of their respective sockets 120 and 100 in the directions indicated by arrows 156 and 155 (FIG. 3), respectively, when the front surfaces 2c of the modules 1 and 20 are not in contact with each other. The springs 151 and 152 urge the modules 20 and 1, respectively, into these forward positions. When the front surfaces 2c of the modules 1 and 20 are pressed against one another as shown in FIGS. 6 and 7, the forces exerted by the springs 152 and 151 on the modules 1 and 20, respectively, and the space in between the chamfers 2g and 2f and the respective tapered stops 103b, 104b, 123b and 124b allow the modules 1 and 20 to float, or move, to a limited degree within their respective sockets 120 and 100. However, the forces exerted by the springs 151 and 152 on the modules 20 and 1, respectively, and the interaction between the chamfers 2g and 2f and the respective tapered stops 103b, 104b, 123b and 124b also limit the freedom of movement of the modules 1 and 20 within their respective sockets 120 and 100 to predetermined alignment tolerances. This limited freedom of movement within predetermined alignment tolerances ensures that the alignment features 10 and 21 find one another, begin to engage one another and ultimately fully mate with one another to bring the modules 1 and 20 into precise optical alignment with one another.

Figure 8A:
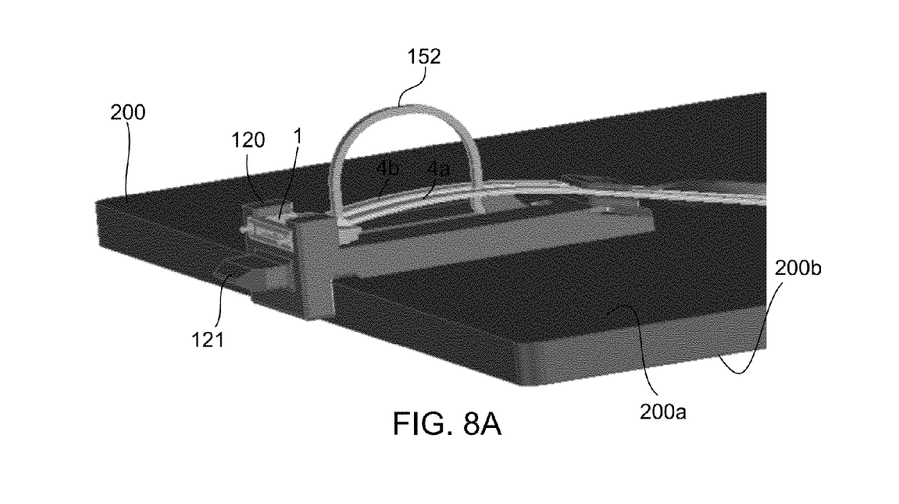
FIGS. 8A and 8B are top and bottom perspective views, respectively, of the male socket shown in FIGS. 3 and 5 mounted on a PCB of a box (not shown) that is designed to be inserted into a slot (not shown) of a rack (not shown).
Figure 8B:
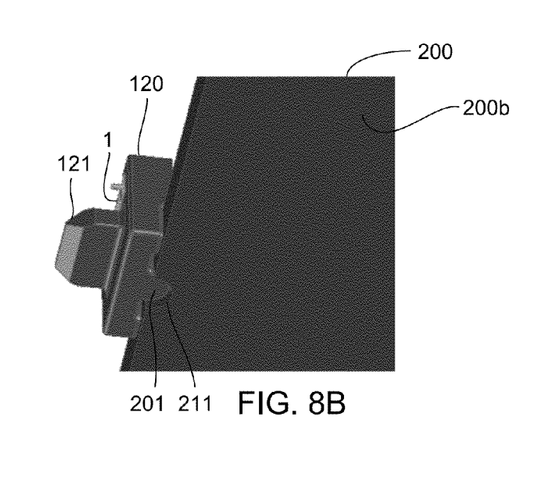
Figure 9A:
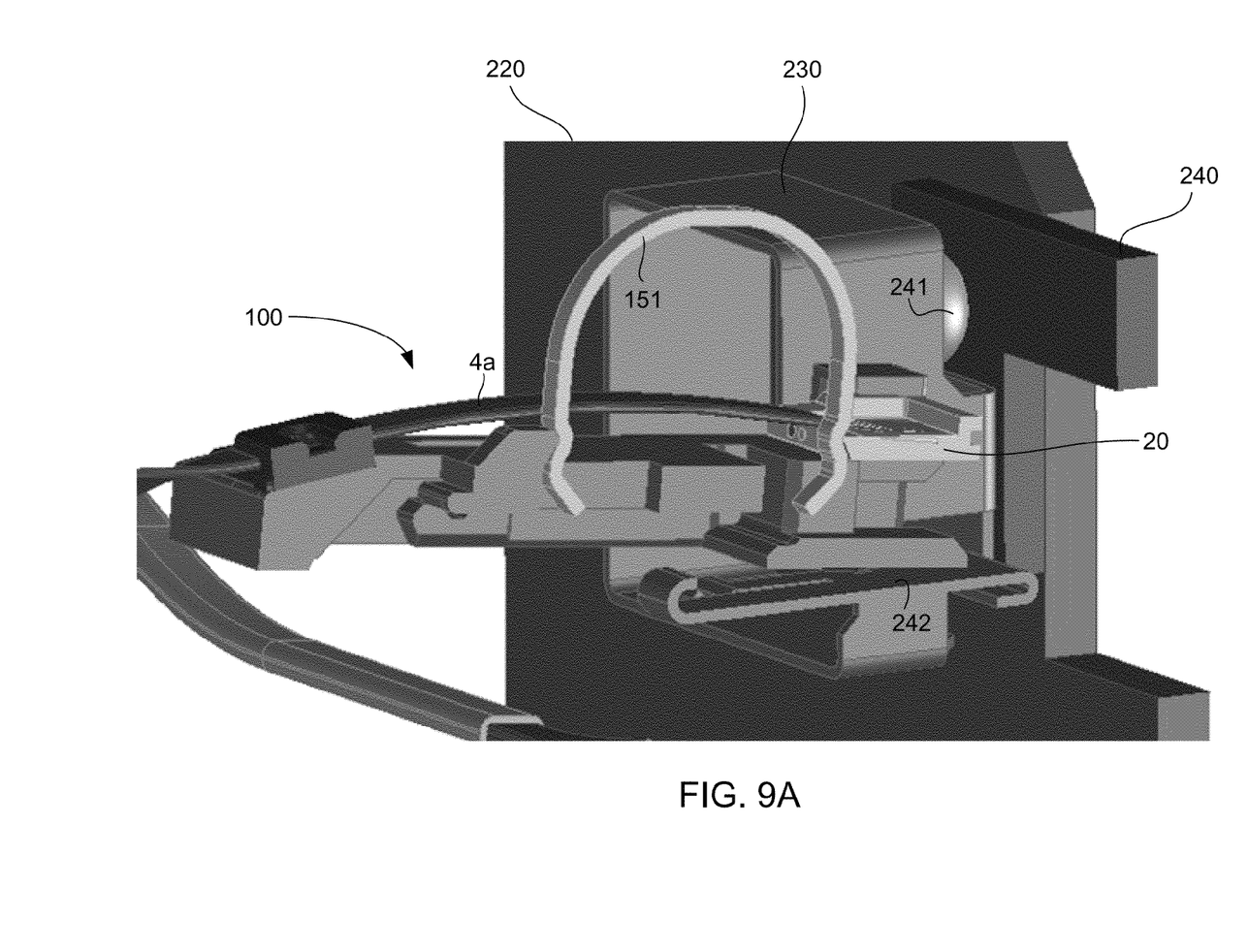
Figure 9B:
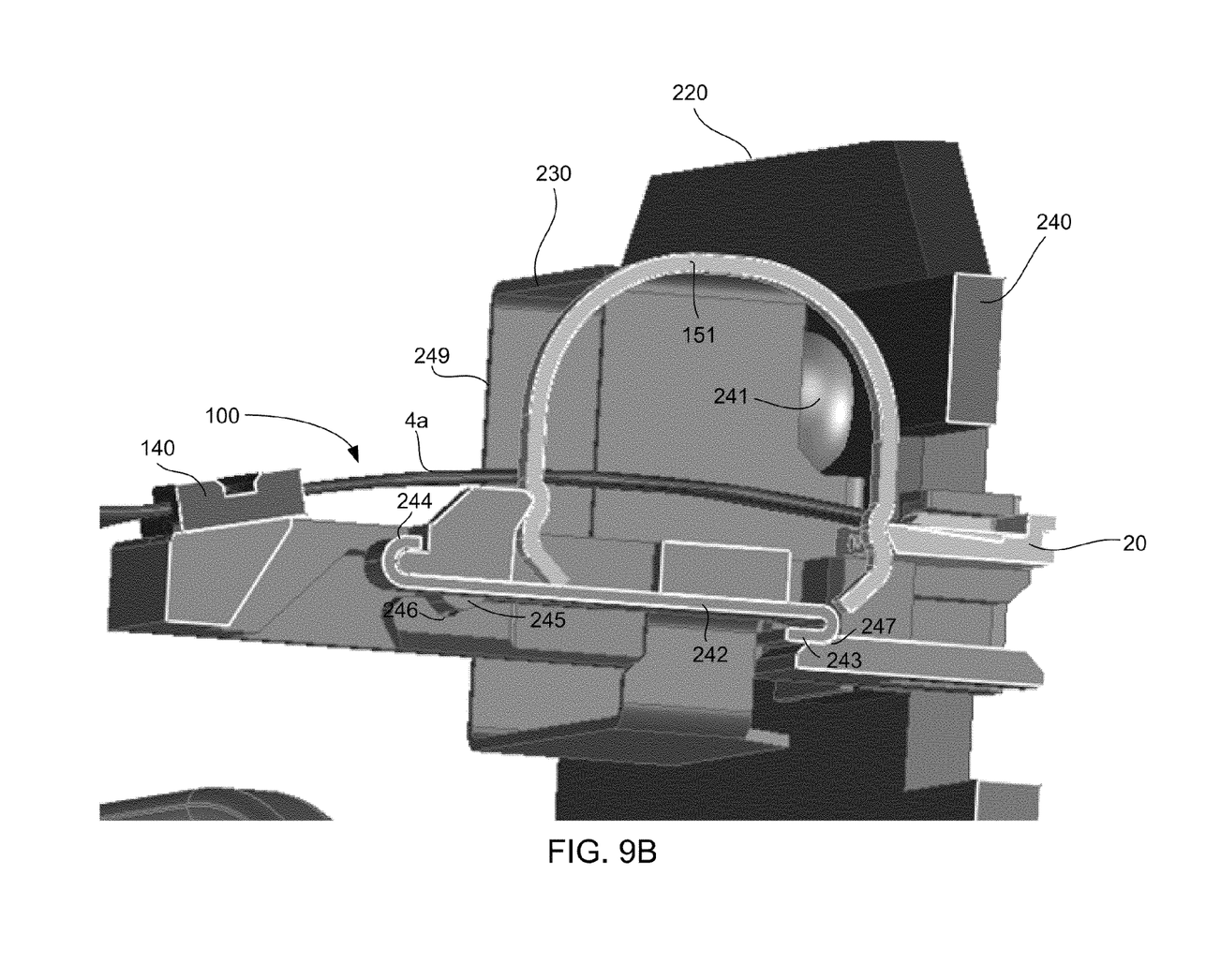
Figure 10:
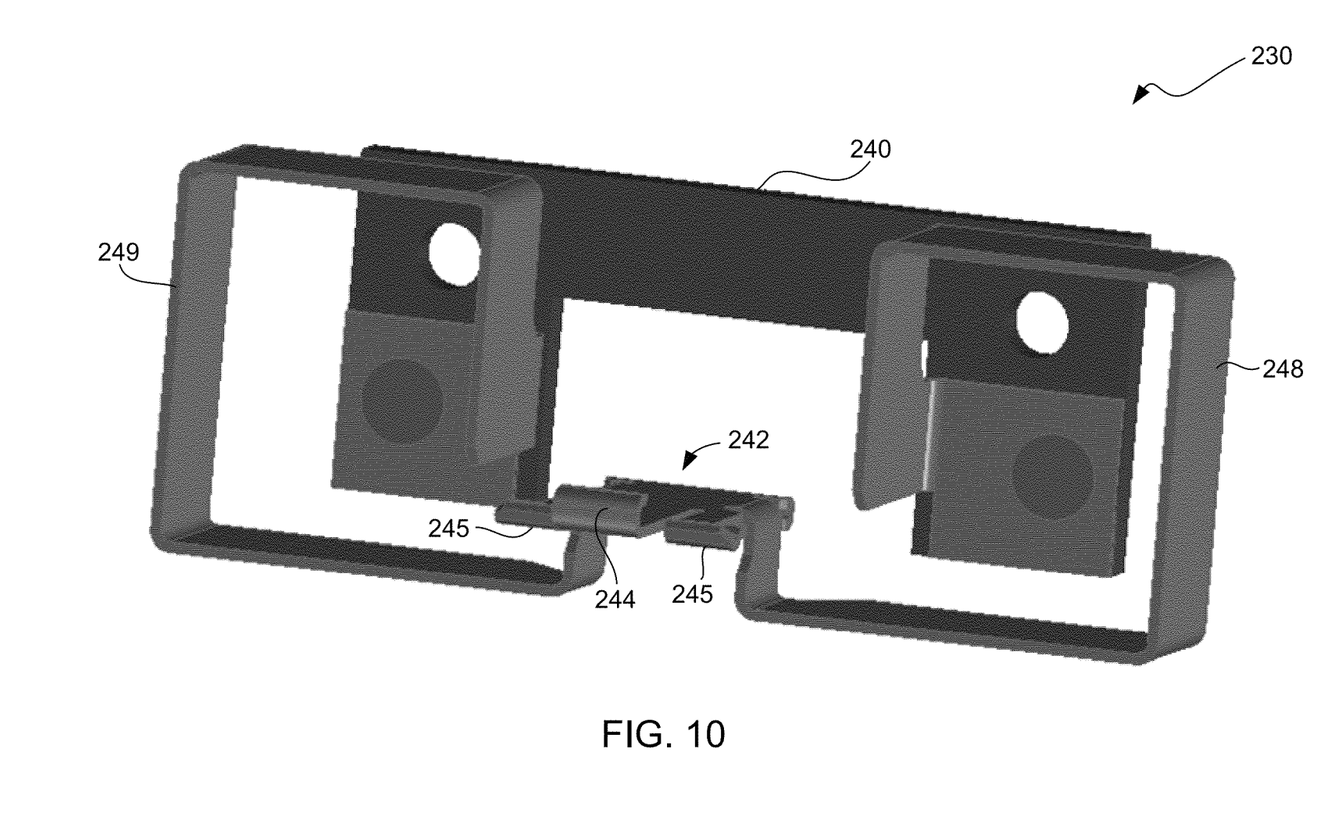
FIG. 10 is a perspective view of the mounting frame shown in FIGS. 9A and 9B with the female socket and the cross bar removed.

The sockets 100 and 120 are typically mounted on respective structures, such as cross bar of a rack and a printed circuit board (PCB) of a box that is designed to be inserted into the rack. FIGS. 8A and 8B are top and bottom perspective views, respectively, of the male socket 120 shown in FIGS. 3 and 5 mounted on a PCB 200 of a box (not shown) that is designed to be inserted into a slot (not shown) of a rack (not shown). FIGS. 9A and 9B illustrate side cross-sectional perspective views of a cross bar 220 of a rack (not shown) having a mounting frame 230 secured thereto by a bridle 240 of the mounting frame 230. The side cross-sectional views of the socket 100 shown in FIGS. 9A and 9B are taken along line A-A' of FIG. 4. In FIG. 9A, the socket 100 is shown as it is about to be mounted on the mounting frame 230, whereas FIG. 9B shows the socket 100 after it has been mounted on the mounting frame 230. FIG. 10 is a perspective view of the mounting frame 230 shown in FIGS. 9A and 9B with the socket 100 and the cross bar 220 removed.

With reference to FIGS. 8A and 8B, for exemplary purposes it will be assumed that the PCB 200 is contained in a box (not shown) that has mating features on it and that the slot of the rack that includes cross bar 220 has mating features on it. These mating features may be, for example, guide rails formed in the slot and bottom side edges of the box. In this exemplary case, when the box is being installed in the rack, the bottom side edges of the box are guided by the guide rails of the slot. Such mating features for installing boxes in slots of racks are well known in the art, and therefore will not be described herein in the interest of brevity.

With reference to FIGS. 9A and 9B, the cross bar 220, the mounting frame 230 and the female socket 100 mounted thereon are typically disposed at the back of the slot. The female socket 100 is secured to the mounting frame 230 (FIG. 9B) in a predetermined position and orientation relative to the cross bar 220, and therefore the module 20 is in a predetermined position and orientation relative to the cross bar 220.

With reference again to FIGS. 8A and 8B, the male socket 120 is disposed at a predetermined location and with a predetermined orientation on the upper surface 200a of the PCB 200. A male keying feature 201 (FIG. 8B) of the socket 120 is complementary in shape and size to a female keying feature 211 (FIG. 8B) formed in the edge of the PCB 200 on which the socket 120 is mounted. When the keying features 201 and 211 are engaged with one another as shown in FIG. 8B, the socket 120 is in its predetermined position and orientation on the PCB 200. When the socket 120 is in its predetermined position and orientation on the PCB 200, the socket 120 is necessarily in a predetermined position and orientation relative to the box in which it is contained due to the fact that the PCB 200 is mounted within the box in a predetermined position and with a predetermined orientation relative to the box.

The edge of the PCB 200 (FIGS. 8A and 8B) on which the male socket 120 is mounted is typically adjacent the back of the box and disposed through a receptacle (not shown) formed in the back of the box. When the box is inserted into the slot and pushed toward the back of the slot until the back of the box comes into contact with the cross bar 220 (FIG. 9B), the female and male sockets 100 and 120 will engage one another and the modules 20 and 1 will engage one another in the manner described above with reference to FIGS. 1-7. Because boxes and racks can be manufactured with very tight tolerances, blind mating of the box with the slot will place the sockets 100 and 120 well within the alignment tolerance needed to allow blind mating of the sockets 100 and 120 with one another. In turn, the blind mating of the sockets 100 and 120 will result in blind mating of the modules 1 and 20 in the manner described above with reference to FIGS. 1-7.

With reference to FIG. 10, the mounting frame 230 is made of a resilient material such as sheet metal, for example, to provide it with spring characteristics. The spring characteristics allow the socket 100 (FIG. 9B) to float, or move, to a limited extent relative to the cross bar 220. The extent of float that the mounting frame 230 allows will depend on the maximum amount of misalignment that there can be between the sockets 100 and 120 while still allowing them to engage one another and ultimately fully mate. For example, if the largest amount of misalignment that there can be between the sockets 100 and 120 while still allowing them to engage one another is ±50 mils in the X, Y and Z dimensions, then the maximum amount of float that the mounting frame 230 will allow is also ±50 mils in the X, Y and Z dimensions. Similarly, the extent of float that the sockets 100 and 120 can have will depend on the maximum amount of misalignment that there can be between the modules 1 and 20 while still allowing them to engage one another and ultimately fully mate. For example, if the largest amount of misalignment that there can be between the modules 1 and 20 while still allowing them to engage one another is ±50 mils in the X, Y and Z dimensions, then the maximum amount of float that the sockets 100 and 120 can have is also ±50 mils in the X, Y and Z dimensions.

With reference to FIGS. 9A and 9B, the bridle 240 of the mounting frame 230 is fixedly secured to the cross bar 220 by rivets 241, although a variety of other fastening devices or materials may be used for this purpose. The mounting frame 230 has a spring socket 242 on which the socket 100 (FIG. 9B) is seated. As can be seen in FIG. 9B, the spring socket 242 has a curved front end 243 and a curved back end 244. The spring socket 242 has a male locking feature 245 on its lower surface that engages a female locking feature 246 formed in the socket 100 to lock the socket 100 in place on the mounting frame 230. The bottom surface of the curved front end 243 of the spring socket 242 engages an indented region 247 formed in the socket 100.

With reference to FIG. 10, it can be seen that there is a pair of the locking features 245. Although it is not visible in the side perspective view shown in FIG. 9B, there is also a pair of the locking features 246 formed in the socket 100. The spring socket 242 (FIG. 10) is mechanically coupled to the bridle 240 by rectangular spring arms 248 and 249. These spring arms 248 and 249 allow the spring socket 242 to float, which, in turn, allows the socket 100 to float as the tongue 121 of the socket 120 engages the receptacle 101 of the socket 100.

It can be seen from the above description of the illustrative embodiments that a combination of features of the modules 1 and 20, the sockets 100 and 120 and the mounting frame 230 allow the socket 100 to float to a limited, predetermined extent relative to the mounting frame 230 and allow the modules 1 and 20 to float to a limited, predetermined extent relative to the sockets 120 and 100, respectively. This limited, predetermined floating allows the mating features 101 and 121 of the sockets 100 and 120, respectively, to blindly mate with one another and allows the mating features 10 and 21 of the modules 1 and 20, respectively, to blindly mate with one another. Thus, as described above, installing a box into a slot of a rack will result in the modules 1 and 20 engaging one another and will result in the optical pathways of the modules 1 and 20 being brought into precise optical alignment with one another.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the features that allow the floating aspects to be achieved are not limited to the features that have been described herein. Persons skilled in the art will understand, in view of the description provided herein, that a variety of mechanism can be used to achieve the floating aspects described herein. Persons skilled in the art will understand the manner in which these and other modifications may be made to the embodiments described herein and that all such modifications are within the scope of the invention.

What is claimed is:

1. A first socket having a first multi-optical fiber connector module mounted thereon, the first socket being adapted to mate with a second socket having a second multi-optical fiber connector module mounted thereon such that mating of the first and second sockets with one another results in mating of the first and second connector modules with one another, the first socket comprising:
   a first socket housing having at least an upper surface, a lower surface, a first end, and a second end, wherein the first multi-optical fiber connector module is mounted on the upper surface of the first socket housing in a predetermined position and orientation relative to the first socket housing, wherein the first multi-optical fiber connector module has a first connector module housing that has at least a first passive fine alignment feature formed thereon; and
   at least a first passive coarse alignment feature formed on the first socket housing, the first passive coarse alignment feature being configured to engage and ultimately fully mate with a second passive coarse alignment feature formed on a second socket housing of the second socket, and wherein engagement of the first and second passive coarse alignment features of the first and second socket housings with one another brings the first and second passive fine alignment features of the first and second connector module housings into coarse alignment with one another, and wherein full mating of the first and second passive coarse alignment features with one another results in full blind mating of the first and second fine alignment features with one another to place the first and second fine alignment features in a fully-mated state, and wherein when the first and second fine alignment features are in the fully-mated state, optical pathways of the first connector module are in precise alignment with respective optical pathways of the second connector module.

2. The first socket of claim 1, wherein the first connector module housing is held in a floating arrangement on the first socket housing that allows the first connector module housing to move to a limited extent relative to the first socket housing, and wherein the floating arrangement ensures that engagement of the first and second passive coarse alignment features of the first and second socket housings with one another will bring the first and second passive fine alignment features of the first and second connector module housings into coarse alignment with one another.

3. The first socket of claim 2, wherein the floating arrangement includes first and second arms disposed on the front end of the first socket housing that engage the first connector module housing and a spring in contact with the first socket housing and with the first connector module housing, and wherein the spring applies a force to the first connector module housing that urges the first connector module housing into the first and second arms.

4. The first socket of claim 3, wherein the first and second arms have first and second inner walls, respectively, that are complementary in shape to first and second features, respectively, formed on opposite sides of the first connector module housing.

5. The first socket of claim 4, wherein when the first and second inner walls are engaged with the first and second features, respectively, formed on the opposite sides of the connector module housing, some space exists in between the first and second inner walls and the first and second features, respectively, and wherein the space provides the first and second features will freedom to move to a limited extent relative to the first and second inner walls, respectively, and wherein the freedom of movement of the first and second features relative to the first and second inner walls, respectively, in combination with the spring force applied to the first connector module housing provides the first connector module housing with freedom to move to a limited extent relative to the first socket housing.

6. The first socket of claim 1, further comprising:
   a cleave holder mounted on the upper surface of the first socket housing near the second end of the first socket housing, the cleave holder being adapted to clamp optical fiber cables that contain optical fibers that are attached on ends thereof to the first connector module housing, wherein the cleave holder is adapted to provide strain relief for the optical fibers.

7. The first socket of claim 1, wherein the first passive coarse alignment feature is a receptacle formed in the first end of the first socket housing, and wherein the second passive coarse alignment feature is a tongue formed on the second socket housing that is complementary in shape to a shape of an inner surface of the receptacle.

8. The first socket of claim 7, wherein the first passive fine alignment feature of the first connector module housing comprises a pair of tapered openings formed in a front face of the first connector module housing, and wherein the second passive fine alignment feature of the second connector module housing comprises a pair of tapered pins disposed on a front face of the second connector module housing, the tapered pins having outer surfaces that are complementary in shape to inner surfaces of the tapered openings.

9. The first socket of claim 7, wherein the first passive fine alignment feature of the first connector module housing comprises a pair of tapered pins disposed on a front face of the first connector module housing, and wherein the second passive fine alignment feature of the second connector module housing comprises a pair of tapered openings formed in a front face of the second connector module housing, the tapered pins having outer surfaces that are complementary in shape to inner surfaces of the tapered openings.

10. A system for blind mating multi-optical fiber connector modules, the system comprising:
   a first structure;
   a mounting frame secured to the first structure, the mounting frame having spring properties;
   a first socket mounted on the mounting frame, the first socket having a first socket housing having at least an upper surface, a lower surface, a first end, and a second end, and wherein the first socket housing has at least a first passive coarse alignment feature thereon;
   a first multi-optical fiber connector module mounted on the upper surface of the first socket housing, wherein the first multi-optical fiber connector module has a first connector module housing that has at least a first passive fine alignment feature thereon;
a first plurality of optical fibers having first ends that are secured to the first connector module housing;
a second structure;
a second socket mounted on the second structure, the second socket having a second socket housing having an upper surface, a lower surface, a first end and a second end, the second socket housing having a second passive coarse alignment feature thereon that is mated with the first passive coarse alignment feature;
a second multi-optical fiber connector module mounted on the upper surface of the second socket housing, wherein the second multi-optical fiber connector module has a second connector module housing that has at least a second passive fine alignment feature thereon that is blind mated with the first passive fine alignment feature when the first and second coarse alignment features are mated with one another, and wherein when the first and second fine alignment features are mated with one another, optical pathways of the first connector module are in precise alignment with respective optical pathways of the second connector module; and
a second plurality of optical fibers having first ends that are secured to the second connector module housing.

11. The system of claim 10, wherein the initial engagement of the first and second passive coarse alignment features of the first and second socket housings with one another brings the first and second passive fine alignment features of the first and second connector module housings into coarse alignment with one another, and wherein the mating of the first and second passive coarse alignment features with one another results in the mating of the first and second fine alignment features with one another.

12. The system of claim 11, wherein the spring properties of the mounting frame allow the first socket to move to a limited extent relative to the mounting frame as the first and second passive coarse alignment features mate with one another.

13. The system of claim 12, wherein the first connector module housing is held in a floating arrangement on the first socket housing that allows the first connector module housing to move to a limited extent relative to the first socket housing, and wherein the floating arrangement ensures that mating of the first and second passive coarse alignment features with one another brings the first and second passive fine alignment features of the first and second connector module housings into coarse alignment with one another.

14. The system of claim 13, wherein said floating arrangement is created in part by first and second arms disposed on the front end of the first socket housing that engage the first connector module housing and a spring that is in contact with the first socket housing and with the first connector module housing, wherein the spring applies a force to the first connector module housing that urges the first connector module housing into contact with the first and second arms.

15. The system of claim 14, wherein the first and second arms have first and second inner walls, respectively, that are complementary in shape to first and second features, respectively, formed on opposite sides of the first connector module housing, and wherein the first and second inner walls are engaged with the first and second features, respectively, formed on the opposite sides of the connector module housing, and wherein some space exists in between the first and second inner walls and the first and second features, respectively, and wherein the space provides the first and second features with freedom to move to a limited extent relative to the first and second inner walls, respectively, and wherein the limited freedom of movement of the first and second features relative to the first and second inner walls, respectively, in combination with the spring force applied to the first connector module housing provides the first connector module housing with freedom to move to a limited to a limited extent relative to the first socket housing.

16. The system of claim 10, further comprising:
a cleave holder mounted on the upper surface of the first socket housing near the second end of the first socket housing, the cleave holder clamping a portion of at least one optical fiber cable that contains the first plurality of optical fibers, wherein the cleave holder provides strain relief for the first plurality of optical fibers.

17. The system of claim 10, wherein the first passive coarse alignment feature is a receptacle formed in the first end of the first socket housing, and wherein the second passive coarse alignment feature is a tongue formed on the second socket housing that is complementary in shape to a shape of an inner surface of the receptacle.

18. The system of claim 17, wherein the first passive fine alignment feature of the first connector module housing comprises a pair of tapered openings formed in a front face of the first connector module housing, and wherein the second passive fine alignment feature of the second connector module housing comprises a pair of tapered pins disposed on a front face of the second connector module housing, the tapered pins having outer surfaces that are complementary in shape to inner surfaces of the tapered openings.

19. The system of claim 17, wherein the first passive fine alignment feature of the first connector module housing comprises a pair of tapered pins disposed on a front face of the first connector module housing, and wherein the second passive fine alignment feature of the second connector module housing comprises a pair of tapered openings formed in a front face of the second connector module housing, the tapered pins having outer surfaces that are complementary in shape to inner surfaces of the tapered openings.

20. The system of claim 10, wherein the first structure is a circuit board located inside of a box having an opening therein, and wherein the second structure is a cross bar of a slot of a rack, wherein the box is installed in the slot, and wherein the first ends of the first and second sockets and front faces of the first and second multi-optical fiber connector modules are disposed adjacent the opening of the box to allow the first and second passive coarse alignment features and the first and second passive fine alignment features to mate with one another, respectively.

* * * * *